Fig. 2

INVENTOR.
RONALD A. GANZE
BY
ATTORNEY

Dec. 13, 1960 R. A. GANZE 2,964,081
APPLE PARING MACHINE
Filed May 22, 1958 8 Sheets-Sheet 3

Fig. 3

INVENTOR.
RONALD A. GANZE
BY
ATTORNEY

R. A. GANZE 2,964,081

APPLE PARING MACHINE

Filed May 22, 1958

INVENTOR.
RONALD A. GANZE
BY
ATTORNEY

Fig. 6

INVENTOR.
RONALD A. GANZE
BY
ATTORNEY

Dec. 13, 1960     R. A. GANZE     2,964,081
APPLE PARING MACHINE
Filed May 22, 1958     8 Sheets-Sheet 7

Fig. 7

INVENTOR.
RONALD A. GANZE
BY
ATTORNEY

Dec. 13, 1960  R. A. GANZE  2,964,081
APPLE PARING MACHINE
Filed May 22, 1958  8 Sheets-Sheet 8

Fig. 8

INVENTOR.
RONALD A. GANZE
BY
ATTORNEY

United States Patent Office 2,964,081
Patented Dec. 13, 1960

1

2,964,081

APPLE PARING MACHINE

Ronald A. Ganze, Marion, N.Y., assignor to F. B. Pease Company, Rochester, N.Y., a corporation of New York Filed May 22, 1958, Ser. No. 737,019

6 Claims. (Cl. 146—39)

This invention relates to fruit and vegetable peeling machines and more particularly to machines for peeling, coring and otherwise preparing apples for cooking and other uses, one object of this invention being the provision of a more satisfactory machine of this nature.

In the food industry, a large number of apples are used for the production of apple sauce, apple pies and other similar uses. In order for apples to be useful for this purpose, all the waste part of the apple must be removed prior to further processing. This necessitates the removal of the peel, stem and the core. The provision of a machine for automatically carrying out these operations is another object of this invention.

Machines of this nature must operate intermittently, that is to say, they must be capable of receiving and performing the necessary operations on each apple in turn. This necessitates a machine that must perform a plurality of separate functions in timed sequence and the provision of such a machine is another object of this invention.

Machines designed for performing a plurality of functions as described above, must necessarily have some means of coordinating the actions of the sub-assemblies performing the various functions. It has been found, however, that the coordinating means are particularly subject to mechanical misadjustment or failure and that machines of this sort frequently get out of time, which impairs the efficiency of the machine and the quality of the product. I have found, however, that this difficulty may largely be overcome by the provision of a machine wherein all the sub-assemblies are driven by means of a single driving means, containing parts for actuating the sub-assemblies in the desired predetermined sequence. The provision of such a machine containing a single driving element for actuating all the parts is therefore another object of this invention.

The working parts of machines used in preparing apples for further processing are subjected to a corrosive action of the apple juice. This corrosive action impairs the function of highly machined mechanisms and therefore necessitates frequent repair and replacement of these parts. For this reason, it is another object of this invention to provide a machine of the above nature having all the working parts which control the operation and sequence and action of the various mechanisms placed remote from the apple being operated upon in order that they may be free from the deleterious effects of the apple juice upon their functioning.

Other objects of this invention include the provision of a machine of the above nature which is simple, positive in operation, and easy to maintain and repair in the field.

Other objects and advantages of this invention will be particularly set forth in the claims and will be apparent from the following description, when taken in connection with the accompanying drawings, in which:

2

Figures 1, 9:
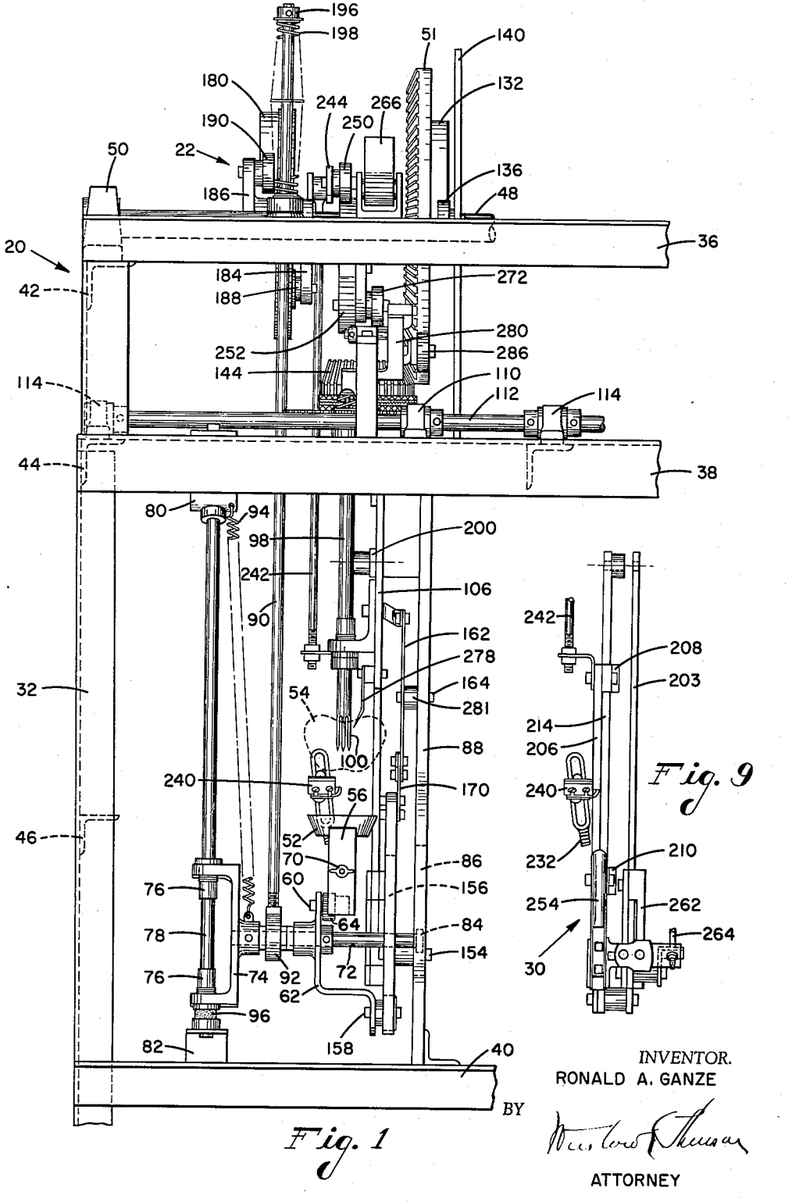
Fig. 1 is a front elevational view of an apple paring machine embodying the present invention.
Fig. 9 is a fragmentary cross-sectional view taken substantially along line 9—9 of Fig. 2 substantially in the direction of the arrows.
Figure 2:
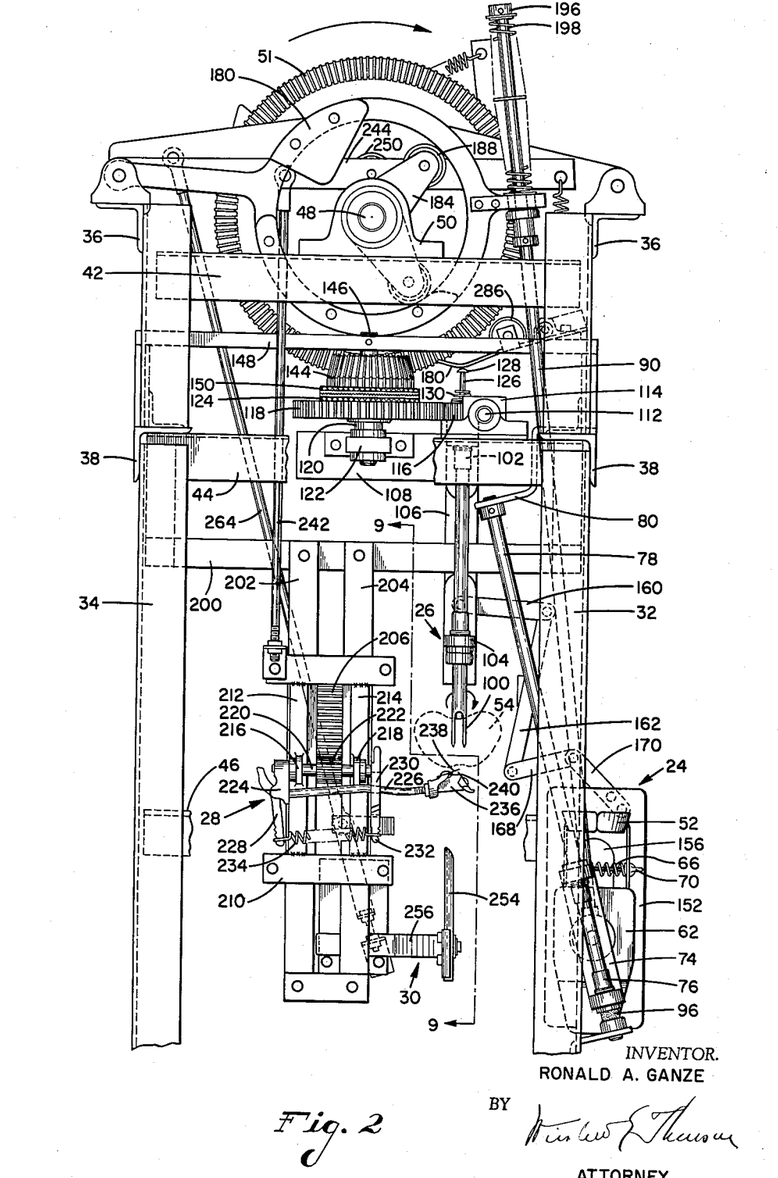
Fig. 2 is a side elevational view of the machine of Fig. 1.

An apple peeling machine embodying this invention and herein described for purposes of illustration, preferably comprises a frame shown generally at 20 (Fig. 1), and supporting a main drive and power transmission mechanism shown generally at 22 and operatively connected to an apple receiving mechanism shown generally at 24 in Fig. 2, a spindle mechanism 26, a paring knife mechanism 28, and a coring mechanism 30.

The operation of the machine may be briefly described as follows. An apple is placed in a cup in the apple receiving mechanism 24 by the operator and this mechanism moves the apple inwardly and upwardly and affixes it to the spindle mechanism 26. The spindle mechanism rotates the apple while the apple paring knife mechanism 28 pares the apple and the coring mechanism 30 removes the core of the apple. Spindle mechanism 26 then ejects the finished pared and cored apple, and the machine is ready to receive a fresh apple for paring as hereinafter described.

Referring now to Fig. 1, frame 20 comprises a plurality of vertical members 32 and 34 connected by upper, middle and lower transverse horizontal members 36, 38 and 40. A similar set of horizontal members 42, 44, and 46 run from front to rear to tie the entire framework into one rigid unit.

The power transmission and drive mechanism 22 preferably comprises a main shaft 48 rotatably mounted in bearings 50 on horizontal member 42 and extending transversely across the entire machine. Shaft 50 serves to transmit power to the entire mechanism, and may be driven by any suitable means (not shown) such as an electric motor, belts from an overhead shaft, or other convenient source of power. Shaft 48 carries a plurality of power transmitting means, such as gears, cams, bell-cranks and the like, which serve to transmit power to the various portions of the machine as hereinafter described. However, these parts will be hereinafter described in connection with their function in transmitting the power to each particular mechanism of the machine.

Figures 5, 10:
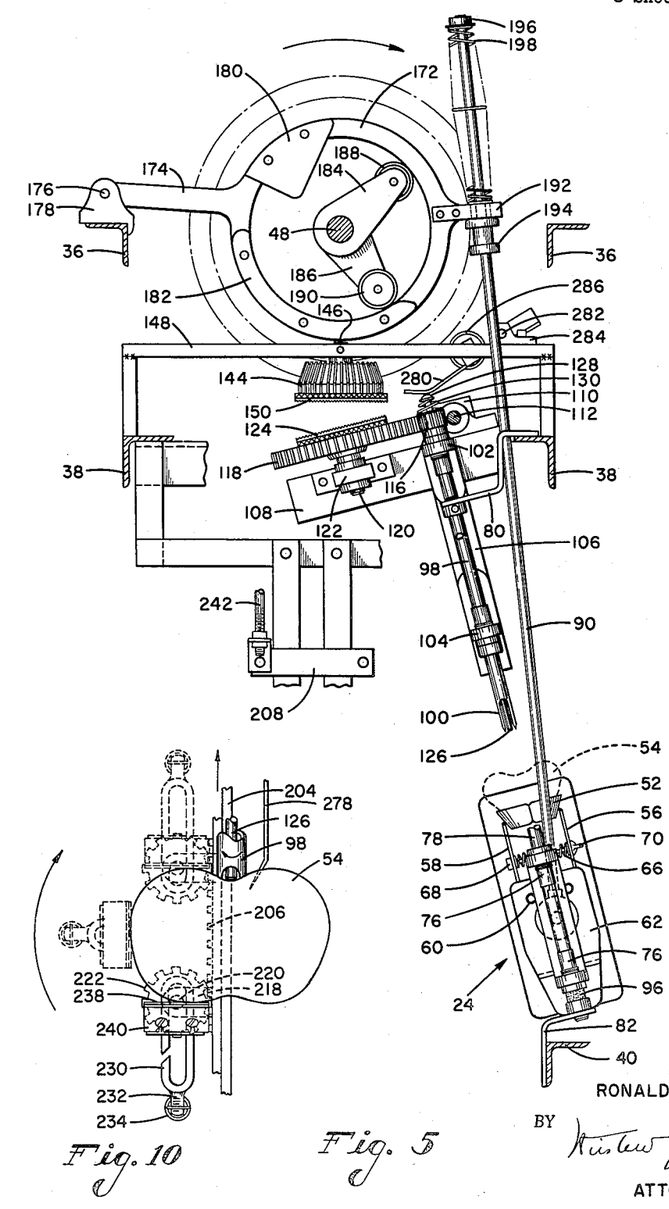
Fig. 5 is a fragmentary side elevational view of the machine showing the machine in the third stage of the operating cycle.
Fig. 10 is a fragmentary elevational view of the knife mechanism engaging and peeling an apple.

The apple receiving mechanism 24 comprises an apple cup 52 (Figs. 1 and 5) adapted to receive an apple 54 as shown in Fig. 5. Apple cup 52 is preferably formed of two substantially semi-circular portions and is of inverted frusto-conical shape in order to receive the bottom of an apple. Cup 52 is mounted on a pair of generally vertically extending straps 56 and 58 (Fig. 5) which are in turn mounted on a pair of studs 60 (Fig. 1) on a plate 62. A pair of gears 64 are affixed to stud 60 and mesh with each other so that studs 60 must always rotate in opposite directions by equal amounts. Straps 56 and 58 are resiliently urged outwardly by a spring 66 (Fig. 5)

positioned around a bolt 68. A wing-nut 70 is provided to limit the outward movement of straps 56 and 58. This arrangement permits the adjusting of the size of cup 52 to fit any desired grade of apples. In order to increase the size of cup 52, nut 70 need merely be backed off, allowing spring 66 to force straps 56 and 58 apart, separating the two halves of cup 52. Meshing gears 64 assure that each stud 60 pivots outwardly by the same amount, thereby preserving the orientation of the center line of the cup in the exact vertical position. Adjustment of the cup to take a smaller apple merely requires the reverse movement of wing-nut 70 which will cause the halves of cup 52 to pivot inwardly, as described above.

Plate 62, which carries the cup mechanism as described above, is pivotally mounted on a short horizontal shaft 72 (Fig. 1). Shaft 72 is in turn fastened to a C-shaped bracket 74 which is slidably mounted by means of a pair of sleeve bearings 76 on an inclined shaft 78, extending between a pair of brackets 80 and 82 and members 38 and 40 of frame 20. The other end of shaft 72 carries a roller 84 riding in an inclined slot 86 (Fig. 4) in an S-shaped member 88 extending between members 38 and 40. An upwardly extending shaft 90 (Fig. 1 and 5) is affixed at the bottom by a collar bearing 92 on shaft 72. Shaft 90 is moved upwardly and downwardly in a reciprocating motion by means associated with the transmission and driving mechanism 22, hereafter to be described, which causes shaft 72 to reciprocate in an inclined upward and downward path. This upward and downward motion is guided by bracket 74 sliding on shaft 78 and by roller 84 moving in diagonal slot 86 in member 88. The downward movement may be somewhat retarded, if desired, by means of a coil spring 94 which counterbalances the weight of the mechanism, and shock may be minimized by the provision of a cushion 96 of rubber or other resilient material around the bottom of shaft 78 immediately above bracket 82 as shown in Fig. 1.

Spindle mechanism 26 preferably comprises a hollow spindle 98 (Fig. 5) terminating at its lower end in a series of sharply pointed tines 100. Spindle 98 is rotatably mounted in a pair of bearings 102 and 104 on a member 106 which projects downwardly from a spindle frame 108. Spindle frame 108 is rotatably mounted by means of a bearing 110 on a horizontally extending rocker shaft 112 mounted on frame 20 by means of bearings 114 as shown in Fig. 1.

The upper end of spindle 98 carries a gear 116 which meshes with a second gear 118 mounted on a stub shaft 120 in a bearing 122 in frame 108. The upper surface of gear 118 carries a clutch plate 124 for purposes hereinafter to be described.

An elongated cylindrical ejector pin 126 extends through hollow spindle 98, and terminates at its upper end in an enlarged head 128. Head 128 is resiliently held in spaced relation with the upper surface of gear 116 by means of a coil spring 130 bearing against the under side of head 128 and the upper surface of the gear.

Figure 3:
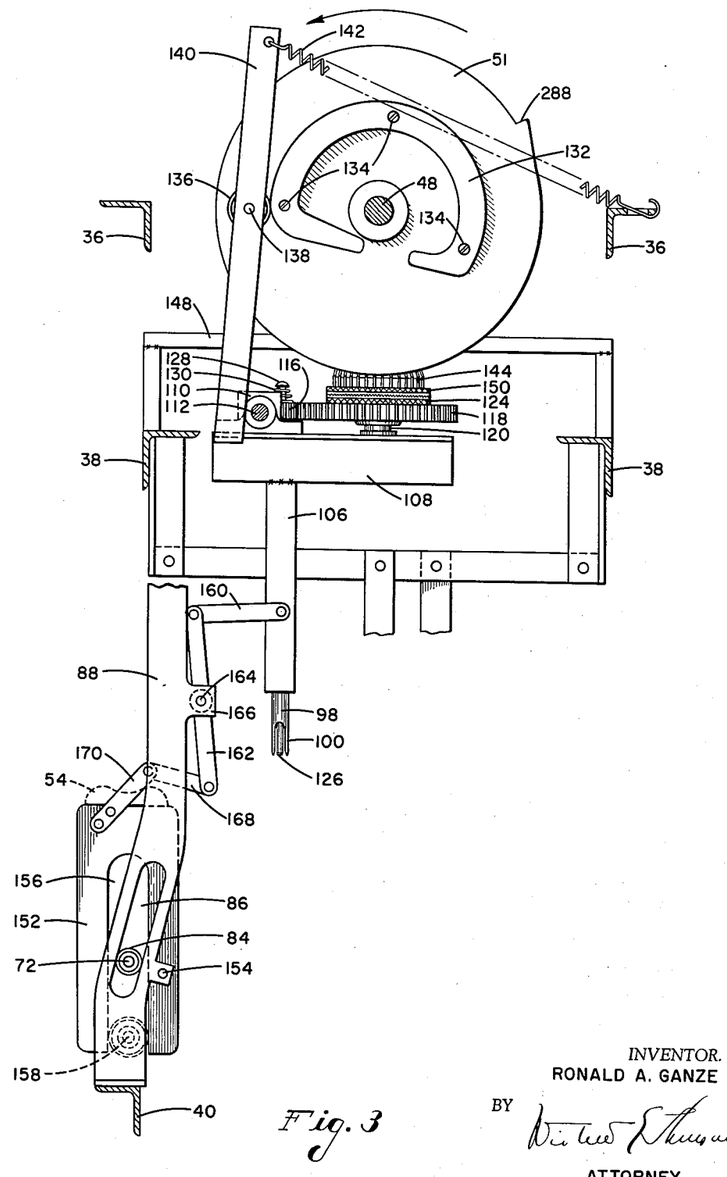
Fig. 3 is a fragmentary side elevational view, showing the side opposite to that shown in Fig. 2, showing the parts in the initial stages of the operating cycle.

The entire spindle mechanism 26, including frame 108 and spindle 98 rocks about shaft 112. The rocking motion is caused by a cam linkage which will now be described. The cam linkage comprises a horseshoe shaped semi-circular cam 132 fastened to the face of gear 51 by means of screws 134 as shown in Fig. 3. A follower 136 mounted on a pin 138 in a vertically extending member 140, bears against the outer surface of cam 132. Follower 136 is held in contact with cam 132 by means of a spring 142 extending from member 140 to member 36 of frame 20, and which urges member 140 to the right as viewed in Fig. 3. The lower end of member 140 is attached to spindle frame 108 so that motion imparted to follower 136 by cam 132 causes frame 108 to rock about shaft 112 from the substantially horizontal position shown in Fig. 3 to the inclined position as shown in Fig. 5 as gear 51 rotates.

Power is transmitted to spindle 98 by means of a bevel gear 144 (Fig. 5) mounted on a stub shaft 146 on a member 148 on frame 20. Gear 144 meshes with gear 51. A clutch plate 150 is mounted on the lower face of bevel gear 144.

Figure 4:
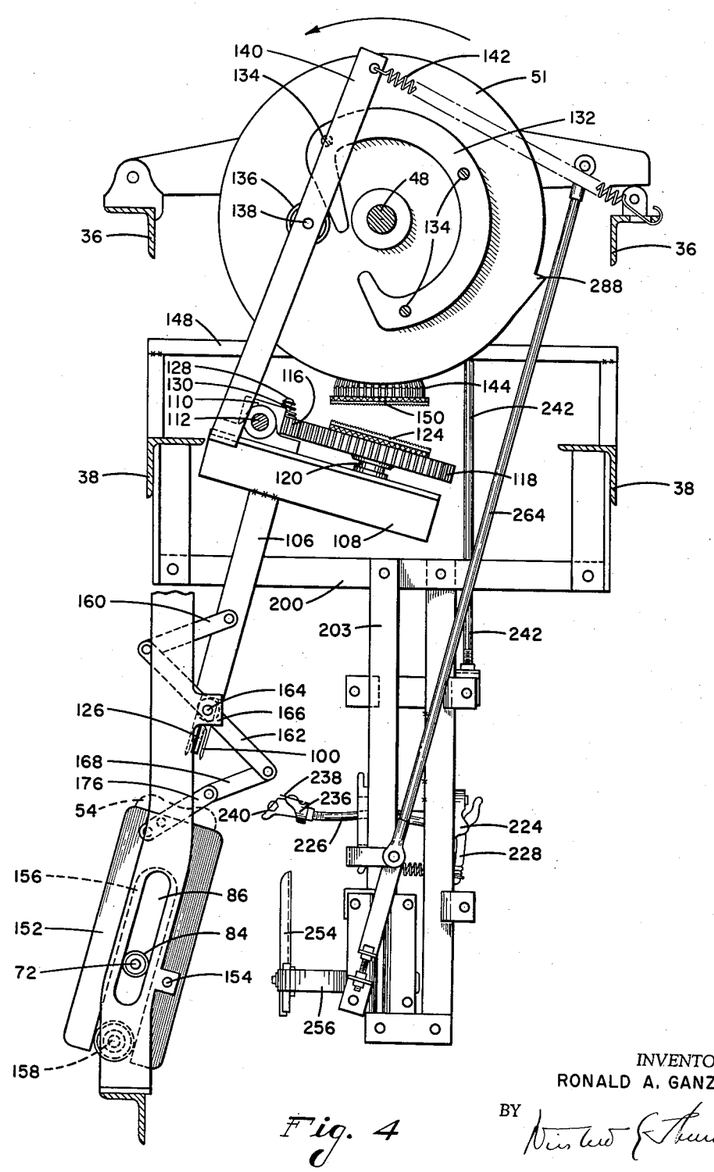
Fig. 4 is a view similar to Fig. 3 showing the machine in the second stage and operating cycle.

When gear 51 rotates in a counter-clockwise direction as viewed in Fig. 3, gear 144 drives upper clutch plate 150. Since lower clutch plate 124 is in contact with upper clutch plate 150, gear 118 is also driven, which drives spindle 98 through gear 116. At the same time, follower 136 is rolling along the outer periphery of cam 132. After gear 51 has revolved through approximately 180°, follower 136 rolls off cam 132 and spring 142 draws member 140 to the right, pivoting spindle frame 108 about rocker shaft 112 to the position as shown in Fig. 4. This movement tilts spindle 98 and at the same time moves clutch plate 124 away from clutch plate 150, thereby disengaging the spindle drive and allowing the spindle to stop rotating. Thus, spindle 98 is driven only when in a substantially vertical position as shown in Fig. 3 and is allowed to come to a halt when the spindle is in an inclined position as shown in Fig. 4.

Vertical member 106 is connected to a plate 152 (Fig. 1 and 3) which is pivotally mounted on member 88 by means of a pin 154. Plate 152 is provided with a slot 156 which engages shaft 72 (Fig. 1) of the apple receiving mechanism described above. Plate 152 is fastened to plate 62 of the apple receiving mechanism by means of a roller 158. Plate 152 is caused to pivot about pin 154 by means of a linkage comprising a link 160 pivotally attached to member 106, and pivotally attached to a rocking link 162. Rocking link 162 is pivoted near its center portion on a pin 164 on an extension 166 of member 88. The other end of rocking link 162 is pivotally connected to a third link 168 which is in turn pivotally connected to a fourth link 170 which is rigidly fastened to plate 152. Thus, when spindle frame is rocked about rocker shaft 112 in a clockwise direction as viewed in Fig. 3, member 106 moves to the left causing link 162 to rock in a clockwise direction. This moves the lower end of link 162 to the right, as viewed in Fig. 3, causing plate 152 to be rocked in a clockwise direction about pin 154 to the position as shown in Fig. 4. This rocking motion orients plate 152 so that slot 156 is parallel to slot 86 in member 88 as viewed in Fig. 4. This movement also causes plate 62 to tilt a similar amount on roller 158, tilting cup 52 to an inclination equivalent to the tilt imparted to spindle 98, and brings cup 52 and spindle 98 into axial alignment as viewed in Fig. 4.

Shaft 90 is reciprocated upwardly and downwardly by means of a mechanism which now will be described. A hollow annular member 172 (Fig. 5) having a horizontally extending projection 174 is mounted on a pin 176 in a bracket 178 on member 36 of frame 20. A pair of inwardly projecting cams 180 and 182 are bolted to the surface of annular member 172. Cams 180 and 182 are offset with respect to each other in an axial direction for purposes hereinafter to be explained. A pair of bell cranks 184 and 186 are mounted on shaft 48 carrying rollers 188 and 190, respectively. Roller 188 is positioned to engage cam 180 and roller 190 is positioned to engage cam 182 but since cams 180 and 182 are axially offset as described above, roller 188 will not engage cam 182 nor will roller 190 engage cam 180.

Annular member 172 has a projecting ring-like portion 192 which surrounds shaft 90. A collar 194 is positioned on shaft 90 immediately below ring 192 and in a position to abut ring 192. A second collar 196 is positioned near the top of shaft 90, and a spring 198 is interposed between collars 196 and ring 192.

Figure 6:
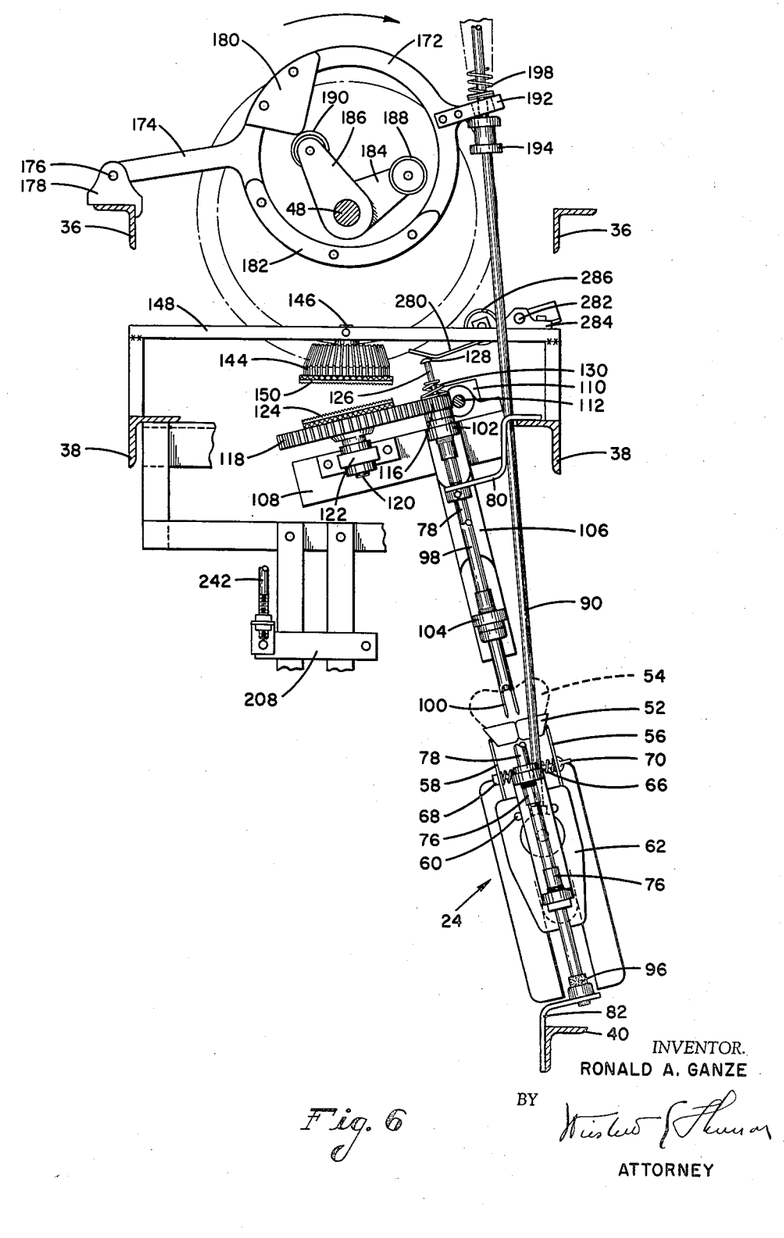
Fig. 6 is a view similar to Fig. 5 showing the machine in the fourth stage of the operating cycle.

When shaft 48 rotates in a clockwise direction as viewed in Fig. 5, roller 188 rotates until it engages the inwardly projecting surfaces of cam 180. Further rotation of shaft 48 causes roller 188 to lift cam 180, pivoting member 172 about pin 176 and lifting ring 192. This compresses spring 198 and lifts shaft 90, lifting the apple receiving mechanism in a diagonally upward path. Since the apple receiving mechanism is movable on shaft 78, this mechanism moves upwardly in an inclined direction parallel to the shaft. As this occurs, roller 84 (Fig. 3) moves upwardly in diagonally oriented slot 86 so that the entire apple receiving mechanism moves upwardly, guided by roller 84 and bracket 74. Since this occurs after cup 52 has been tilted as described above and brought into axial alignment with spindle 98, an apple placed in cup 52 will be brought upwardly in axial alignment with spindle 98 and the apple will be forced onto tines 100 of the spindle as shown in Fig. 6. The fact that the upward movement of shaft 90 is not positively controlled by the cam, but spring 198 is interposed between the cam and the shaft, cushions the shock of the impact of the apple with the spindle and yet provides sufficient force to gently but firmly force the apple onto the spindle.

Further rotation of shaft 48 disengages roller 188 from cam 180 and releases the upward force on shaft 90. Shaft 90 along with the apple receiving mechanism is now free to move downwardly under its own weight to its original position. However, it has been found desirable to provide positive means for causing the apple receiving mechanism to move downwardly, since often this action will not occur with the requisite speed. Means for doing this comprises bell-crank 186 and roller 190 described above. Immediately after roller 188 clears cam 180, bell-crank 186 engages cam 182 and positively forces member 172 to rotate in a clockwise direction about pin 176 as viewed in Fig. 5. This causes ring 192 to engage collar 194 and positively forces shaft 90 and the associated apple receiving mechanism downwardly. The shock of this downward movement is minimized by spring 94 and by rubber cushion 96 under bracket 74 described above.

After the apple has been impaled on tines 100 of spindle 98 as described above, cam 132 on gear 51 engages follower 136 on member 140 and tilts spindle frame 108 back to its vertical position as shown in Fig. 3. This causes upper and lower clutch plates 124 and 150 to engage thereby causing spindle 98 with the attached apple to rotate.

The paring knife mechanism 28 for peeling the apples impaled on tines 100 of spindle 98 comprises a framework consisting of a horizontal member 200 (Fig. 2) supporting a pair of vertical members 202 and 204 carrying the paring knife carriage and its associated parts. A stationary rack 206 is rigidly mounted between members 202 and 204.

A knife carriage is slidably mounted on vertical members 202 and 204. The knife carriage comprises a pair of horizontal members 208 and 210 fastened together by vertical members 212 and 214. The entire carriage is free to reciprocate in a vertical direction on members 202 and 204. A pair of forwardly extending bearings 216 and 218 are mounted on members 212 and 214, respectively. A shaft 220 is rotatably mounted in bearings 216 and 218 and carries a pinion gear 222 which engages stationary rack 206. A downwardly extending U-shaped bracket 224 is rigidly mounted on one end of shaft 220. A transversely extending substantially horizontal knife arm 226 is pivotally mounted in U-shaped bracket 224 for rotation in a substantially vertical plane. Knife arm 226 carries a downwardly extending serrated arm 228 for purposes hereinafter to be described.

The other end of shaft 220 carries a downwardly extending slotted bracket 230 terminating in a stud 232 (Fig. 2). A coil spring 234 extends between arm 228 and stud 232 and serves to resiliently urge knife arm 226 to pivot upwardly and outwardly in a counterclockwise direction as viewed in Fig. 2.

The end of knife arm 226 carries a knife holder 236 which carries a knife blade 238 and a guide 240. Both knife blade 238 and guide 240 are adjustably fastened to holder 236 so that the depth of the cut of the knife 238 may be adjusted.

Figure 7:
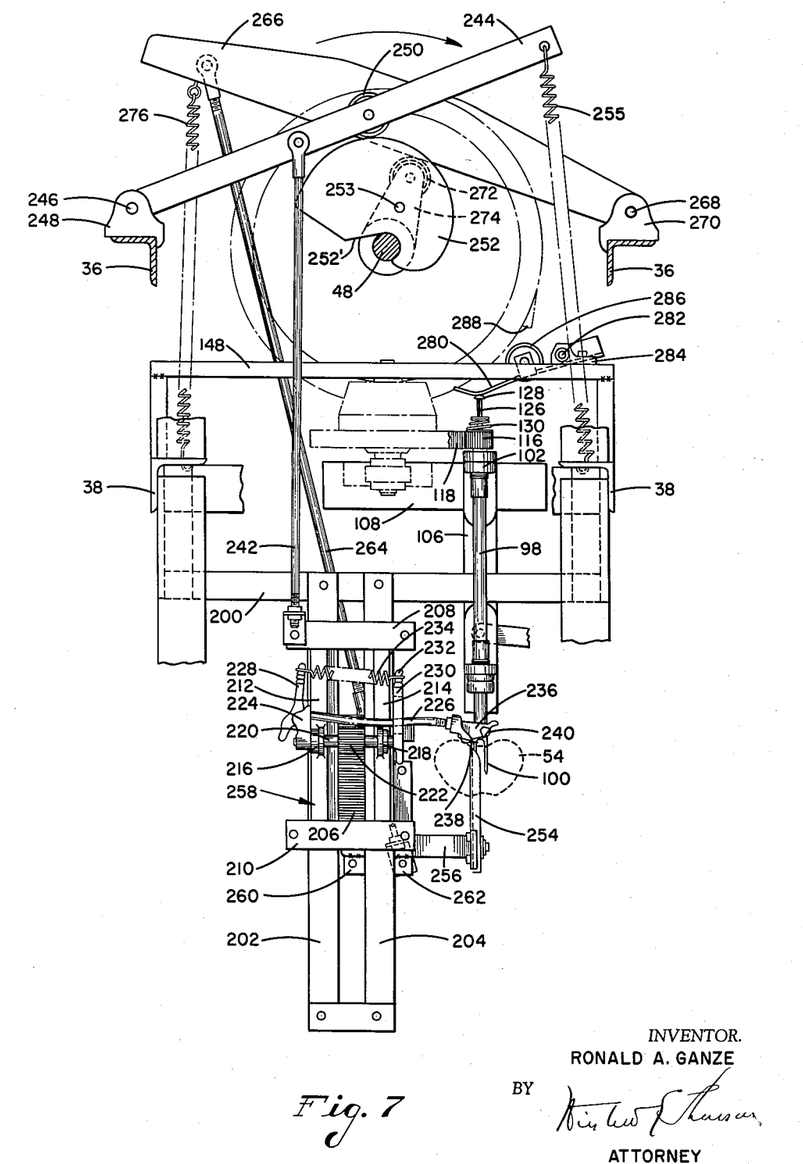
Fig. 7 is a fragmentary front elevational view of the machine showing the machine in the fifth stage of the operating cycle.
Figure 8:
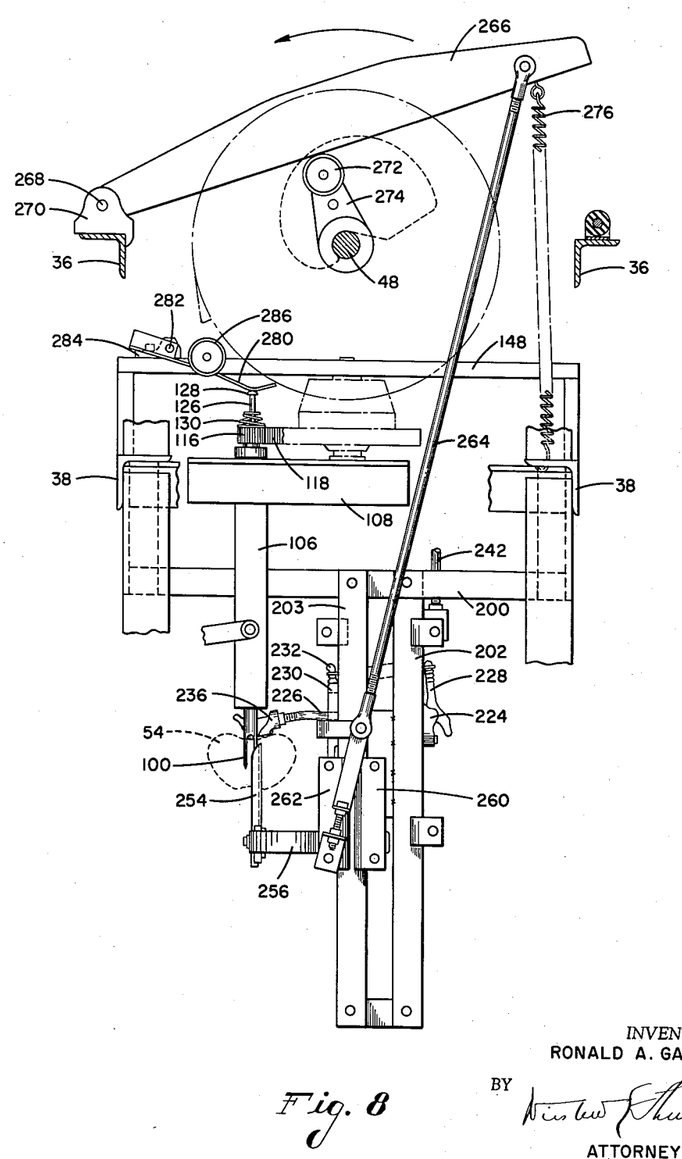
Fig. 8 is a view similar to Fig. 7 showing the machine in the last stage of the operating cycle.

The knife carriage is reciprocated in an upwardly and downwardly direction on vertical members 202 and 204 by means of a rod 242 (Figs. 2 and 7) and is attached to a horizontally extending arm 244 (Fig. 7) which is pivotally attached by means of a pin 246 to a bracket 248 on member 36 of frame 20. Arm 244 carries a cam roller 250 which rolls on periphery of a cam 252 attached to main shaft 48. Cam 252 does not encircle shaft 48, but merely lies against it in a notch 252' formed in the periphery of the cam, and is held in position by bolt 253 against an arm 274, which is fixed to the shaft, as hereinafter described. A spring 255 is attached to one end of arm 244 and to member 38 of frame 20 to urge arm in a downward direction in order to maintain positive contact between roller 250 and cam 252. As shaft 48 rotates, cam 252 causes arm 244 to pivot upwardly and downwardly, thereby imparting an upward and downward motion to rod 242 which causes the knife carriage to slide upwardly and downwardly on vertical members 202 and 204 thereby reciprocating the knife mechanism.

As the knife carriage reciprocates upwardly and downwardly, as described above, pinion 222 rolls along rack 206 causing the shaft 220 to rotate. This rotates U-shaped bracket 224 and bracket 230 in a clockwise direction as shown by the arrow in Fig. 10, causing the knife blade to move in a semi-circular path upwardly and around the periphery of the apple impaled on spindle 98. This is clearly illustrated in Fig. 10, wherein the knife is shown in its initial position in solid lines and in successive positions in dotted lines. As the knife rotates upwardly in contact with the rotating apple on spindle 98, the knife blade 238 peels the apple. Since knife on holder 236 is resiliently mounted in bracket 224, the knife arm may move outwardly away from the apple and thereby will compensate for irregularities in size and shape of the apple, but the resilient force of spring 234 will insure that the knife always remains in contact with the apple and will follow the contour thereof thereby shaving a continuous spiral strip of peel as the knife moves upwardly about the rotating surface of the apple.

Coring mechanism 30 preferably comprises a semi-cylindrical coring knife 254 (Fig. 7) mounted in axial alignment but slightly off center from spindle 98. Coring knife 254 is mounted on a bracket 256 on a carriage 258 slidably mounted on single vertical member 203 (Fig. 9). Carriage 258 comprises two vertical members 260 and 262 on either side of vertical member 203 in a position to slide vertically therealong. Carriage 258 is given a vertical reciprocating motion by means of a rod 264 extending upwardly to a horizontal arm 266 pivotally mounted on a pin 268 on a bracket 270 mounted on member 36 of frame 20. Arm 266 is in a position to be engaged by a roller 272 mounted on a bell-crank 274 fixed to main shaft 48. A spring 276 is provided for urging the end of arm 266 downwardly in order to maintain the arm in contact with roller 272. As shaft 48 rotates, crank 274 and roller 272 move upwardly and come into contact with arm 266 causing the same to pivot upwardly in a clockwise direction as viewed in Fig. 7, to raise rod 264, to cause carriage 258 to slide upwardly on member 204, causing coring knife 254 to enter the rotating apple, cutting out a cylindrical slug therefrom to remove the core of the apple.

Means are also provided for cutting out the stem and the portion of the apple immediately adjacent thereto during the peeling operation described above. This means comprises a fixed blade 278 (Fig. 1) mounted on a short stud 281, member 106. When the apple is first impaled on tines 100 of spindle 98, blade 278 is also forced into the apple, and when the apple begins to rotate, a frusto-conical slug is immediately cut out of the apple around the stem, removing the stem and the portions immediately adjacent thereto.

Means are also provided for ejecting the peeled, cored, and stemmed apple from the machine after the operation is complete. This means comprises of ejector pin 126 inside of hollow spindle 98, as described above. As will be recalled, when the apple is forced onto spindle 98, ejector pin 126 is forced upwardly moving head 128 of pin 126 upwardly against arm 280 (Fig. 7) which is pivotally mounted on a pin 282 in a bearing 284 on frame 20. Arm 280 carries a roller 286 which is adjacent to the periphery of gear 51. Gear 51 carries a small projection 288 which is adapted to engage roller 286 to cause arm 280 to pivot downwardly about pin 282, forcing ejector pin 126 downwardly. The lower end of ejector pin 126 then contacts the peeled and cored apple, and pushes the same off spindle 98, and the operation on the apple is completed.

In operation, before starting the machine, the operator adjusts cup 52 to receive the desired size of apples to be peeled during the forthcoming production run. This is accomplished by manipulating wing nut 70 (Fig. 5) which causes arms 56 and 58 to move either towards each other or away from each other as the case may be. This causes cup 52 to become either larger or smaller, and thus the cup may be adjusted to firmly grasp the desired size of apple. The operator then chooses the proper shape of cam 252 (Fig. 7) which has its periphery ground to raise the paring knife mechanism at the proper rate in order to cause the knife to move around the particular shape of apple to be pared. In other words, if a substantially spherical apple is to be pared, cam 252 will be chosen with a circular surface, but if an oblong shaped apple is to be pared, a cam with a corresponding surface will be used. This adjustment may be made by replacing the cam which is bolted to crank arm 274 as described above. Since cam 252 does not encircle shaft 48, but merely lies thereagainst, this cam may be replaced without in any way disturbing the shaft or any of the other mechanisms of the machine.

The machine is now adjusted for the particular apples to be processed, and is ready for use. The machine is put into operation by applying power to main shaft 48 which puts this shaft and all the associated mechanisms into motion. An apple 54 (Fig. 5) is now placed in cup 52 by the operator. As shaft 48 rotates, cam 132 engages roller 136 on arm 140 (Fig. 3) and allows the arm to pivot in a clockwise direction as viewed in the figure from the position shown in Fig. 3 to the position shown in Fig. 4, under the action of spring 142. This causes carriage 108 to tilt, tilting spindle 98, and at the same time disengaging clutch surfaces 124 and 150, bringing spindle 98 to a halt. At the same time, the apple receiving mechanism is tilted a corresponding amount in the opposite direction by means of links 160, 162, 168 and 170, and the apple receiving mechanism moves from the position as shown in Fig. 3 to that shown in Fig. 4. Spindle 98, and the apple resting in cup 52 are now in axial alignment. At this point in the operation, bell-crank 184 and roller 188 contact cam 180 on annular member 172, and cause the same to move upwardly around pin 176 to the position shown in Fig. 6. This raises shaft 90, and causes the entire apple receiving mechanism to slide upwardly along shaft 78 causing the apple to be impaled on tines 100 of spindle 98. This also causes ejector pin 126 to be forced upwardly to project above the upper surface of gear 116.

Further rotation of shaft 48 causes roller 188 on bellcrank 184 to disengage cam 180, and, at the same time causes roller 190 on bell-crank 186 to engage cam 182 on annular member 172. This forces annular member 172 to rotate downwardly and about pin 176, forcing shaft 190 downwardly and returning the apple receiving mechanism to its original lower position as shown in Fig. 5. This disengages the apple receiving mechanism, including cup 52, from the apple which now remains in its position impaled on tines 100 of spindle 98.

Further rotation of shaft 48 causes cam 132 (Figs. 3 and 4) to engage roller 136 on arm 140 forcing the arm to the left as viewed in these figures against the resilient force of spring 142. This pivots carriage 108, and brings clutch surfaces 124 and 150 into contact, and at the same time causes spindle 98 to assume its vertical position as shown in Fig. 3. At the same time, movement of carriage 108 to its original position moves the apple receiving mechanism 24 to its original vertical position by means of links 160, 162, 168 and 170. The apple receiving mechanism 24 is now in poistion to receive another apple while the apple that has been impaled upon spindle 98 is being peeled and cored as hereinafter described.

Further rotation of shaft 48 causes spindle 98 to revolve. This rotation is imparted to the spindle by means of gear 51 which meshes with gear 144 which transmits power to gear 118 by means of clutch surfaces 124 and 150. Gear 118 transmits power to gear 116 which is mounted on the upper part of spindle 98. As the spindle 98 rotates with the apple impaled thereon, cam 252 moves into engagement with roller 250 on arm 244 (Fig. 7) causing the arm to move upwardly and pivot about pin 246. This moves rod 242 in an upward direction and causes the apple paring mechanism to slide upwardly on vertical members 202 and 204. Upward movement of the apple paring mechanism brings knife 238 in contact with the revolving apple, and the paring operation begins. As the paring mechanism continues to move upwardly, the knife is rotated in a clockwise direction as viewed in Fig. 10, by means of gear 222 engaging rack 206 and thus, as the knife moves upwardly, it is also moved about a generally circular path following the periphery of the apple, shaving a spiral peel therefrom. Minor irregularities in the size and shape of the apple are compensated for by the movement of knife arm 226 in bracket 224 against the force of spring 234 which resiliently holds the knife in contact with the apple at all times during this operation.

While the paring operaiton is occurring as described above, stationary knife blade 278 on member 106 is also cutting a frusto-conical piece from around the stem of the apple, thereby stemming the apple while the peeling operation is taking place.

Shortly after the paring operation begins, as described above, bell-crank 274 carrying roller 272 (Fig. 7) engages arm 266. This causes arm 266 to move upwardly in a clockwise direction as viewed in Fig. 7, raising rod 264 causing coring mechanism to move upwardly. This causes coring knife 254 to move upwardly and to enter the rotating apple, cutting a cylindrical slug from around the core of the apple, thereby coring the apple while the peeling operation is taking place.

After the peeling and coring operations have taken place, cam 252 disengages roller 250 on arm 244, and the arm is allowed to move downwardly under the urging of spring 254. This causes the paring mechanism to return to its original lower position. At the same time, bellcrank 274 and roller 272 disengage arm 266, and allow the same to return to its original position under the urging of spring 276. This allows the coring mechanism to slide downwardly and to return to its original lower position. The apple is now completely peeled, cored and stemmed.

Further rotation of shaft 48 causes projection 288 to come into contact with roller 286 (Fig. 7) and to cause arm 280 to pivot downwardly about pin 282. This causes arm 280 to force ejector pin 126 downwardly which ejects the finished apple from spindle 98, and the finished apple falls downwardly into a trough or other suitable container, and the paring operation on this particular apple is finished.

While the paring and coring operations are taking place, as described above, the apple receiving mechanism has returned to its original vertical position ready to receive another apple. Thus, the operator has time to insert another apple while the peeling, coring and stemming operations are taking place. Thus, the operator can continuously feed a succession of apples into the machine which will receive one apple while operating on another, and then will automatically take the apple just inserted, and place it on the paring spindle and operate thereon while returning the receiving mechanism to position for the insertion of still another apple.

While this machine has been described as consisting of a single unit, in practice it has been found desirable to place four units on a single framework and driven by a single main shaft 48. When set up in this arrangement, it has been found preferable to have two machines operating in synchronism and two other machines one-half cycle out of phase with the first two. Thus, the operator can place two apples in the cups of the first pair of machines, and then be ready to place two other apples in the cups of the second pair of machines while the first pair are placing their apples on their spindles. When set up in this arrangement, four machines may be fed by one operator, which allows a continuous peeling coring and stemming of four apples at one time, resulting in a very high rate of production.

It may thus be seen that this invention accomplishes its stated objects. The entire machine is driven by one single main shaft which actuates all the other working parts of the machine through a series of cams and bellcranks and rollers which operate the various parts in timed predetermined sequence. Once the cams, bellcranks and rollers have been properly adjusted on the main shaft, all the other parts of this machine must necessarily operate in precise predetermined sequence, and thus, once the machine has been initially adjusted, none of the parts can get out of time. Further, all the operating parts are concentrated along the main shaft above the body of the machine and remote from the parts that contact the apple, and thus all the parts which operate the machine and hold the same in time are removed from the corrosive and other deteriorating effects of the apple juice. The only parts that contact the apple juice are the paring and coring knives, and these parts may be easily and quickly replaced.

While there has been shown and described the preferred forms of mechanisms of the invention, it will be apparent that various changes and modifications may be made therein, particularly in the form and relation of parts, without departing from the spirit of the invention as set forth in the appended claims.

I claim:

1. An apple paring machine comprising, in combination, a frame, a rotatable shaft mounted on said frame, a rotatable spindle driven by said shaft, means for receiving an apple, means of said shaft having a camming action for lifting said receiving means for causing it to impale said apple on said rotatable spindle, paring means, a cam removably mounted on said shaft and having a notch formed in the periphery thereof for receiving said shaft and partially surrounding the same, said cam being adapted for lifting said paring means to cause the same to contact said apple for paring the same.

2. An apple paring and coring machine comprising, in combination, a frame, a rotatable shaft mounted on said frame, a rotatable spindle adapted to be driven by said shaft, means for receiving an apple, a cam on said shaft adapted to lift said apple receiving means to impale an apple on said rotatable spindle, a knife movably mounted on said frame for contacting said apple for peeling the same, a second knife movably mounted on said frame for entering the center of said apple for coring the same, a clutch interposed between said shaft and said rotatable spindle, a second cam on said shaft for engaging and disengaging said clutch, a third cam on said shaft for lifting said first and second knife means to cause them to contact said apple, said cams being arranged on said shaft to perform their function in precise predetermined time sequence.

3. An apple paring and coring machine comprising, in combination, a main frame, a rotatable shaft mounted on said main frame, apple receiving means, a second frame mounted for tilting motion on said main frame, a spindle rotatably mounted in said second frame, a clutch plate connected to said spindle, a second clutch plate connected to said shaft, means associated with said shaft for tilting said second frame to a first position wherein said first and second clutch plates are in contact and to a second position for separating said clutch plates and for bringing said spindle axially in line with said apple receiving means, a cam actuated by said shaft for causing said receiving means to move axially toward said spindle to impale an apple on said spindle, and means actuated by said shaft for paring and coring the apple impaled on said spindle.

4. An apple paring and coring machine comprising, in combination, means for receiving an apple including a cup movable from a substantially horizontal position to an inclined position, rotatable spindle means, means associated with said cup for tilting said spindle from a substantially vertical position to an inclined position axially in line with said cup when in tilted position, means for moving said cup upwardly in an inclined path toward said spindle to impale the apple therein on said spindle, and means for paring and coring the apple impaled on said spindle.

5. An apple paring machine comprising, in combination, a frame, a rotatable shaft mounted on said frame, apple receiving means including a cup movable from a substantially horizontal position to an inwardly inclined position, rotatable spindle means movable from a substantially vertical position to an inclined position axially in line with said cup when in an inclined position, a knife movable to a position adjacent to said spindle, power transmission means connected to said shaft and including a clutch for driving said spindle, a cam on said shaft for engaging and disengaging said clutch and, for tilting said spindle, a third cam on said shaft for moving said cup from horizontal position to inclined position and moving the same axially in an upward path to impale an apple on said spindle, and fourth cam means on said shaft for moving said knife means into contact with said apple impaled on said spindle for paring same.

6. An apple paring and coring machine comprising, in combination, a main frame, a rotatable shaft mounted on said main frame, apple receiving means mounted on said frame including a cup movable from a substantially horizontal position to an inwardly inclined position, a second frame mounted for tilting motion on said main frame, a spindle rotatably mounted on said second frame, a clutch plate connected to said spindle, a second clutch plate connected to said shaft, means associated with said shaft for moving said second frame to a first position where said first and second clutch plates are in contact and to a second position for separating said clutch plates and for bringing said spindle axially in line with said apple receiving means when in tilted position, means actuated by said shaft for causing said apple receiving means to move from a horizontal position to a tilted position and for causing the same to move axially toward said spindle to impale an apple thereon, and means actuated by said shaft for paring and coring the apple impaled on said spindle.

References Cited in the file of this patent

UNITED STATES PATENTS

| | | |
|---|---|---|
| 693,778 | Boutell | Feb. 18, 1902 |
| 1,615,914 | Pease | Feb. 1, 1927 |
| 1,823,854 | Coons | Sept. 15, 1931 |
| 2,242,244 | Ewald | May 20, 1941 |